(12) United States Patent
Tsunoda et al.

(10) Patent No.: US 6,746,758 B2
(45) Date of Patent: Jun. 8, 2004

(54) INSULATING MATERIAL AND ELECTRIC MACHINE WINDING AND METHOD FOR MANUFACTURING THE SAME

(75) Inventors: Tomoya Tsunoda, Hitachi (JP); Mitsuru Onoda, Takahagi (JP); Shigeo Amagi, Toukai (JP); Tatsuo Honda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/208,833

(22) Filed: Aug. 1, 2002

(65) Prior Publication Data

US 2003/0035960 A1 Feb. 20, 2003

Related U.S. Application Data

(63) Continuation of application No. 09/914,203, filed as application No. PCT/JP99/04640 on Aug. 27, 1999, now abandoned.

(51) Int. Cl.$^7$ .............................. B32B 27/04; H02K 3/00
(52) U.S. Cl. ................. 428/297.4; 428/324; 428/411.1; 428/474.4; 310/179; 310/180
(58) Field of Search ............................ 428/297.4, 320.2, 428/324, 332, 340, 341, 363, 402, 411.1, 413, 474.4; 310/179, 180; 174/120

(56) References Cited

U.S. PATENT DOCUMENTS 6,069,430 A * 5/2000 Tsunoda et al. ............ 310/180
6,288,341 B1 * 9/2001 Tsunoda et al. ........ 174/137 B

FOREIGN PATENT DOCUMENTS

| JP | 55-53802 | 4/1980 |
| JP | 55-147753 | 10/1980 |
| JP | 63-110929 | 5/1988 |
| JP | 6-223662 | 8/1994 |
| JP | 9-45133 | 2/1997 |
| JP | 11-234938 | 8/1999 |

* cited by examiner

Primary Examiner—Philip Tucker
Assistant Examiner—Michael J Feely
(74) Attorney, Agent, or Firm—Mattingly, Stanger & Malur, P.C.

(57) ABSTRACT

In order to provide an electric machine winding having an insulating layer excellent in electric characteristics and an insulating layer of an electric machine winding excellent in electric characteristics, a high-thermal-conductivity insulating layer 11 is formed around the peripheral portion of a winding conductor 10 by the use of a high-thermal-conductivity insulating tape 1 having a mica layer 3, a reinforcing material layer 5, and a high-thermal-conductivity filler layer 7, wherein the amount of resin of the mica layer 3 makes up 10 wt % to 25 wt % of the total weight of the insulating material and wherein the amount of resin of the high-thermal-conductivity filler layer 7 makes up 10 wt % to 25 wt % of the total weight of the insulating material.

6 Claims, 3 Drawing Sheets

INSULATING MATERIAL AND ELECTRIC MACHINE WINDING AND METHOD FOR MANUFACTURING THE SAME

This is a continuation application of U.S. Ser. No. 09/914,203, filed Feb. 25, 2002, now abandoned which is a 371 of PCT/JP99/04640, filed Aug. 27, 1999.

TECHNICAL FIELD

The present invention relates to an insulating material for forming the main insulation of an electric machine winding, a rotary electric machine winding and a method for manufacturing the same.

BACKGROUND ART

A method for manufacturing an insulating layer of a winding used for a rotary electric machine by winding around a bunch of conductors an insulating material having a mica layer, a reinforcing material layer, and a filler layer including fillers having a high thermal conductivity, wherein these layers contain a thermosetting resin, is described in Japanese Unexamined Patent Application No. 63-110929. This insulating material is wound around the outer peripheral portion of a bunch of winding conductors and the resin in the insulating material is heated and cured while applying pressure thereto to form an insulating layer of the electric machine winding. When the electric machine winding is manufactured, the conductor side is wrapped with the above-mentioned mica and the reinforcing insulating material, and the insulating material layer is impregnated with a thermosetting resin composition containing fine-particle-shaped inorganic fillers and is then pressed, heated, and cured. In this respect, there is described a method for impregnating or applying the thermosetting resin composition containing fillers into or to a mica foil before the winding of a mica foil around the bunch of conductors.

In Japanese Unexamined Patent Application No. 55-53802 is described an insulating material in which an aggregate mica sheet is mixed with synthetic fibers and high-thermal-conductivity inorganic powder and is impregnated with a thermosetting resin. In this connection, in this patent gazette is described an insulating sheet made by bonding a glass cloth to an aggregate mica foil with an epoxy resin.

DISCLOSURE OF THE INVENTION

There is no problem in using an electric machine winding having an insulating layer formed of the above-mentioned insulating material for a rotary electric machine operated at low voltage. However, if the electric machine winding is used for such a rotary electric machine operated at high voltage as an industrial generator or a high-voltage electric machine, there may be cases where it presents a problem in electric characteristics because of an electric defect. The present inventor investigated the cause of the electric defect of the insulating material and found that the electric defect was attributed to part of fine bubbles which were included in the resin of the mica layer, the reinforcing material layer and the filler layer and were not discharged with part of the resin but were left in the insulating material when the insulating layer was wound around a bunch of conductors of the electric machine winding and was formed by pressing. The inventor found that this was caused by the insufficient flow or the unbalanced flow of the impregnated resin produced in a process for pressing, forming, curing the insulating layer of the electric machine winding because the amount of resin in each layer of the mica layer and the filler layer is not kept at a suitable value.

It is an object of the present invention to provide an insulating material capable of producing an insulating layer of an electric machine winding excellent in electric characteristics and an electric machine winding having an insulating layer excellent in electric characteristics.

BEST MODE FOR CARRYING OUT THE INVENTION

Figure 1A:
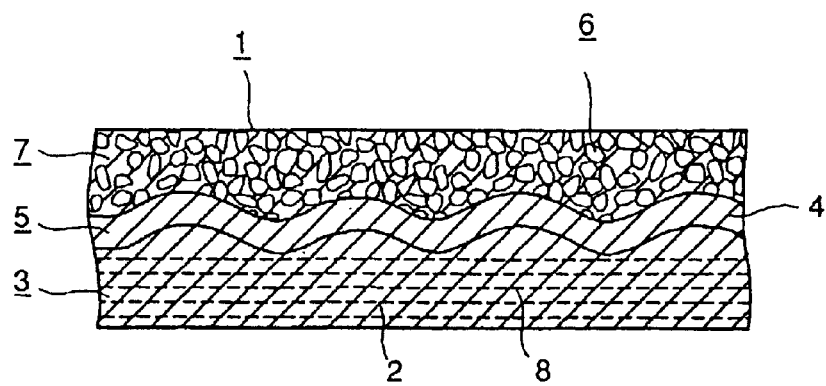
FIGS. 1(a) and 1(b) are cross-sectional views of a material structure of a high-thermal-conductivity insulating tape of a preferred embodiment in accordance with the present invention.

According to the present preferred embodiment in accordance with the present invention, there is provided an insulating material having a flake-shaped inorganic insulating material layer made of a flake-shaped mica or the like, a reinforcing material layer of the inorganic insulating material layer, and a filler layer bonded to the above-mentioned reinforcing material layer and the above-mentioned flake-shaped inorganic insulating material layer or to the above-mentioned reinforcing material layer, and having a semi-cured thermosetting resin for bonding the above-mentioned inorganic insulating material layer, the reinforcing material layer, and the filler layer, wherein the amount of resin of the above-mentioned inorganic insulating material layer is 10 to 25 wt % of the total weight of the insulating material, and wherein the amount of resin of the above-mentioned filler layer is 10 to 25 wt % of the total weight of the insulating material, and wherein the difference between the amount of resin of the inorganic insulating material layer and the amount of resin of the filler layer is not more than 10 wt % by weight. In the above-mentioned insulating material, the flake-shaped inorganic insulating material means, for example, mica and a mica layer having mica arranged in the predetermined direction with the thermosetting resin is a dielectric layer for ensuring electric insulation of a winding or a coil.

The reinforcing material layer laminated adjacently to the inorganic insulating material layer is a fiber-like insulating material such as a glass cloth or a film such as a polyimide film, and in particular, ensures mechanical strength in two dimensional directions of the insulating material. The filler layer preferably includes inorganic fillers and/or short fibers having a thermal conductivity of 5 W/m·K or more and it is effective that 1 wt % to 80 wt % by weight, in particular, 2 wt % to 50 wt % by weight of the inorganic fillers are spherical fillers. A suitable amount of spherical fillers can improve the dispersion of fillers into resin and provide a resin composition with a suitable flow when an insulating tape is wound around a bunch of conductors and is formed by pressing. This can discharge fine bubbles in the wound insulating tape from the insulating layer with the resin.

It is preferable that average particle diameter of particle-shaped fillers or foil-shaped fillers (for example, alumina) is 0.1 μm to 20 μm, in particular, 0.2 μm to 10 μm. If the particle size is too small, the viscosity of the thermosetting resin increases and the flow of the resin deteriorates when the insulating material layer is wound around the bunch of conductors. If the particle size is too large, the flake-shaped mica may be damaged when the insulating material layer is formed by pressing. In general, it is preferable that the size of the spherical fillers is larger than the size of the amorphous fillers. This is because the amorphous fillers enter gaps between the spherical fillers to increase the thermal conductivity of the filler layer.

One example of a method for manufacturing spherical fillers is to blow filler particles such as quartz, alumina, titanium oxide, silicon dioxide into a flame to melt part of surfaces of the particles and to form them into a round shape. The particle is not necessarily formed in a real spherical shape. The round particles smoothly flow in the resin as compared with unprocessed particles. The use of random-shaped filler particles and round fillers in combination will suitably keep the flow of the thermosetting resin.

A preferable mica layer as an inorganic insulating material is a layer including aggregate mica foils made of small mica flakes, and in particular, a sheet made of flake-shaped mica (mica sheet) by a paper making method and impregnated with the thermosetting resin. The mica flakes are laminated and arranged in nearly parallel to two dimensional directions and are bonded to each other with the thermosetting resin.

The reinforcing material layer is made of a reinforcing material, such as a glass cloth. In order to bond this reinforcing material layer to the mica layer, the reinforcing material layer is impregnated with a thermosetting resin and is bonded to the mica foil and then the resin is semi-cured. As the glass cloth, a woven cloth or a nonwoven cloth is used and the woven cloth is more suitable. The thickness of the glass cloth is freely selected, and preferably, is about 0.04 mm to 0.1 mm.

The filler layer is made by dispersing fillers having a thermal conductivity of at least 5 W/m·K and made of high-thermal-conductivity inorganic particles, for example, alumina, boron nitride, magnesium oxide, aluminum nitride, magnesium fluoride, silicon dioxide, aluminum fluoride, into a thermosetting resin and by filling them. As the fillers, foil-shaped alumina may be used. The filler layer is a thermal-conductivity layer in which the inorganic particles play a role in transmitting and diffusing outside heat generated in the winding of a rotary electric machine. An inorganic filler having a thermal conductivity of 30 W/m·K or more, for example, alumna, boron nitride, is particularly preferable. The inorganic fillers not only are in the filler layer but also may be in a net of cloth in the reinforcing material layer. It is preferable that 1 wt % to 80 wt % by weight of the inorganic fillers are spherical fillers. The use of suitably spherical fillers can improve the dispersion of the non-spherical fillers in the resin and produces the suitable flow of the resin and discharges fine bubbles included in the insulating material layer with the resin outside a forming die when the insulating material layer is formed by pressing and is cured.

The insulating material contains a thermosetting resin such as an epoxy resin, an unsaturated polyester resin, an alkyd resin, a melamine resin, a polyimide resin and the total amount of resin makes up 20 wt % to 50 wt % of the total weight of insulating material. Each of the amount of resin in the mica layer and the amount of resin in the filler layer is adjusted, respectively, such that it is 10 wt % to 25 wt % of the total weight of the insulating material.

Here, each of the amount of resin in the mica layer and the filler layer is adjusted, respectively, such that it is 10 wt % to 25 wt % of the total weight of the insulating material because of the following reason. The insulating material is used as a shape of a prepreg. In other words, the thermosetting resin impregnated into or applied to the mica layer, the reinforcing material layer, and the filler layer is semi-cured to be in a B stage (in a state where it is not sticky when it is handled). When the insulating layer of the electric machine winding is formed, in a process for winding the insulating tape or sheet around a bunch of conductors in the number of layers required to produce a necessary dielectric strength and for pressing and forming the laminated insulating material, fine bubbles included in the mica layer, the reinforcing material layer, and the filler layer are discharged with the extra resin. In order to discharge the fine bubbles with the resin, and to ensure the amount of resin required for keeping insulating property and mechanical strength, it is necessary to impregnate each of the mica layer and the filler layer with the amount of resin of not less than 10 wt % of the total weight of the insulating material. Also, each of the amount of resin in the mica layer and in the filler layer is made not more than 25 wt % of the total weight of the insulating material. This is because if the amount of resin exceeds 25 wt % of the total weight of the insulating material, workability decreases and the insulating material becomes wrinkled and hence a good insulating layer can not be produced when the insulating material is wound around the winding conductor. Also, this is because the amount of fillers is relatively insufficient and thus the thermal conductivity of the insulating material decreases. In particular, it is desirable that each of the amount of resin of the mica layer and the amount of resin of the filler layer is adjusted, respectively, in such a way that it makes up 12 wt % to 18 wt % of the total weight of the insulating material. In this case, the total amount of resin makes up 24 wt % to 36 wt % of the total weight of the insulating material. In this connection, in the above-mentioned calculation, the amount of resin in the reinforcing material layer is included in the amount of the mica resin.

Also, as for the amount of resin of the insulating material in accordance with the present invention, the difference between the amount of resin in the mica layer and the amount of resin in the filler layer is made not more than 10 wt % by weight, more particularly, not more than 5 wt % by weight. Most preferably, both the layers are nearly equal to each other in the amount of resin. Here, the difference between the amount of resin in the mica layer and the amount of resin in the filler layer is made not more than 10 wt % by weight. This is because if the difference between the amount of resin in the mica layer and the amount of resin in the filler layer exceeds 10 wt % by weight, part of resin including fine bubbles to be discharged outside enters and remains in a layer having a smaller amount of resin from a layer having a larger amount of resin in a pressing process when the insulating layer of the electric machine winding is formed. In particular, the difference between in the amount of resin is not more than 5 wt % by weight, the extra flow of resin into the other layer is not generated. Therefore, the case is best in which both the layers are nearly equal to each other in the amount of resin.

In this connection, the amount of resin in the reinforcing material, for example, in the glass cloth, is not more than about 7 wt %, in general, 3 to 5 wt % of the total weight of the insulating material.

The insulating layer of an electric machine winding in accordance with the present invention is formed by the use of an insulating material having a dielectric layer, a reinforcing material layer, and a thermal-conductivity layer, wherein the amount of resin in each layer of the dielectric layer, and the thermal-conductivity layer is made 10 wt % to 25 wt % of the total weight of the insulating layer. The dielectric layer is a mica layer including mica foils. The reinforcing material layer is a layer including a reinforcing material, for example, a glass cloth, or a polyimide film. The thermal-conductivity layer is a filler layer including fillers having a thermal conductivity of at least 5 W/m·K, for example, alumina fillers. Each layer contains a thermosetting resin, for example, an epoxy resin. The total amount of resin makes up 20 wt % to 50 wt % of the total weight of the insulating material and the amount of resin in the mica layer makes up 10 wt % to 25 wt % of the total weight of the insulating material and the amount of resin in the filler layer makes up 10 wt % to 25 wt % of the total weight of the insulating material.

The insulating material in accordance with the present invention is shaped in a tape or a sheet and is wound around a bunch of insulated single wires such that it overlaps densely each other every turn. This is put in a forming die of an unhermetical type and the thermosetting resin in the tape or the sheet is pressed, heated, and cured, when part of the resin is pushed out from the insulating layer with bubbles. For this reason, it is preferable that the forming die is an unhermetical type. The ideal amount of resin of the tape or the sheet is 25 wt % to 40 wt % of the weight of the main insulating material and it is preferable that the amount of resin finally remaining in the main insulating layer is 20 wt % to 30 wt %, in particular, 28 wt % to 32 wt % of the weight of the main insulating material.

The insulating material is wound around the outer peripheral portion of the bunch of winding conductors in such a way that either the mica layer or the filler layer is next to the winding conductor side. Then, a die-releasing agent is applied to the outer peripheral portion of the insulating material wound around the winding conductors. Then, a forming jig is mounted and the insulating material is pressed on the outer surface via the forming jig (at about 20 kg/cm2 to 50 kg/cm2) and is heated (at about 180° C.). In this manner, fine bubbles included in the insulating material are discharged with a part of resin in the insulating material while simultaneously curing the resin in the insulating material to form an insulating layer. An electric machine winding manufactured in this way is inserted into the slots of a stator or an armature of a rotary electric machine.

According to the present invention, the insulating layer formed around the bunch of conductors can have extremely excellent electric characteristics, for example, an alternating current dielectric breakdown voltage of 26.5 kV/mm to 29.0 kV/mm.

Figure 4:
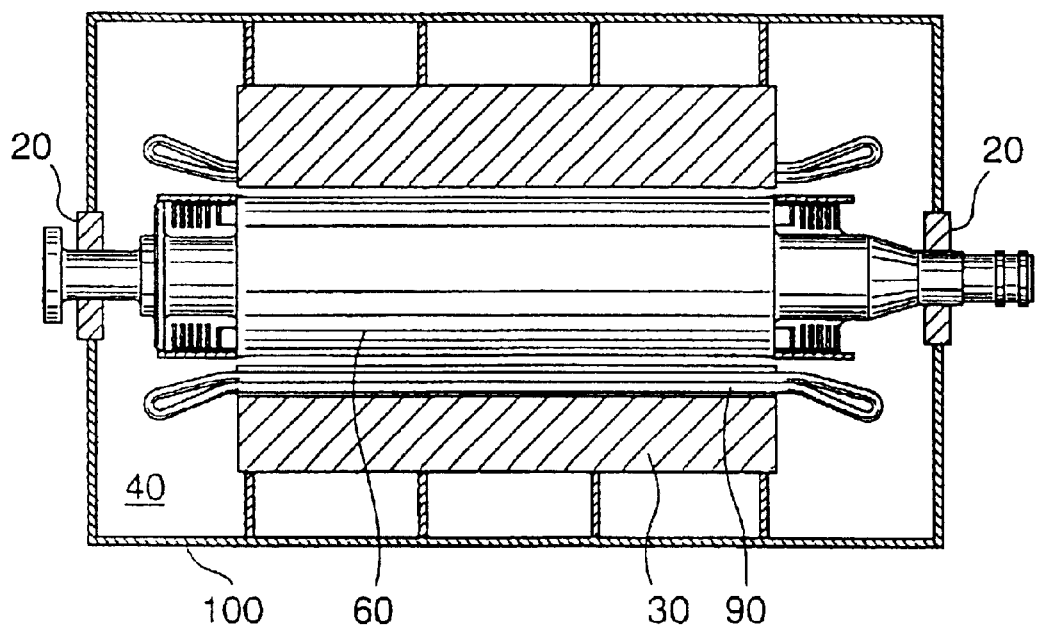
FIG. 4 is a cross-sectional view of a structure of a rotary electric machine of a preferred embodiment in accordance with the present invention.
Figure 5:
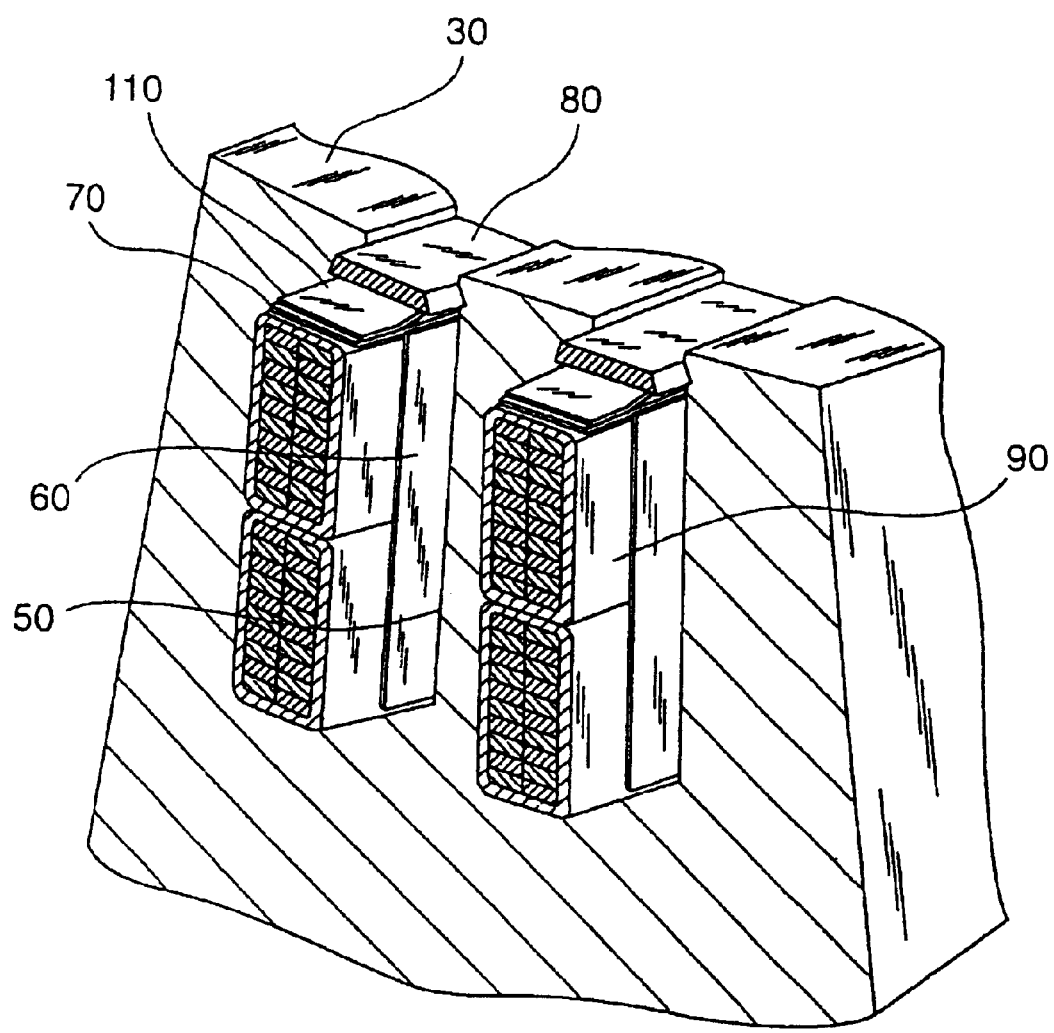
FIG. 5 is a cross-sectional perspective view for illustrating a structure of a stator in FIG. 4.

FIG. 4 is a cross-sectional view of a rotary electric machine 40 to which the present invention is applied. FIG. 5 is a cross-sectional perspective view of the stator of a rotary electric machine 40 to which the present invention is applied. In the drawings, a stator 30 is supported by a stator frame 100. A winding 90 manufactured by the present invention is inserted into the slot 50 of the stator 30. Similarly, an armature 60 is rotatably supported by a bearing 20 mounted on the stator frame 100. The winding 90 inserted into the slot 50 of the stator is fixed in the slot with springs 70, 110 and a wedge 80.

(Preferred Embodiment 1)

Figure 1B:
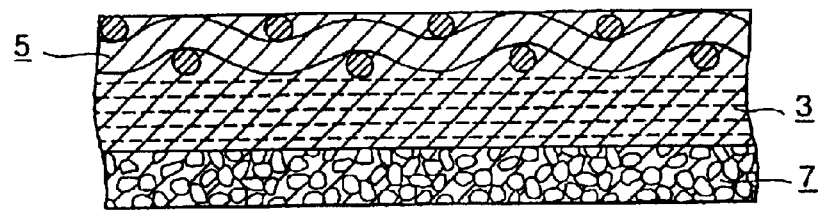

A preferred embodiment in accordance with the present invention will be described on the basis of the drawings. Describing the material structure of the high-thermal-conductivity insulating tape 1 (high-thermal-conductivity prepreg tape) of the preferred embodiment in accordance with the present invention on the basis of FIG. 1a, the high-thermal-conductivity insulating tape 1 has a laminate in which a mica layer 3 (dielectric layer) having an aggregate mica foil 2, a reinforcing material layer 5 having a glass cloth 4, and a high-thermal-conductivity filler layer 7 (thermal-conductivity layer) having alumina particles 6 are laminated in this order. In this connection, as shown in FIG. 1b, the laminate may be made by laminating the high-thermal-conductivity filler layer 7, the mica layer 3, and the reinforcing material layer 5 in this order. Also, the high-thermal-conductivity insulating tape 1 includes resin 8 in each of the mica layer 3, the reinforcing material layer 5, and the high-thermal-conductivity filler layer 7, and the total amount of resin 8 makes up 31.4 percent of the total weight of the high-thermal-conductivity insulating tape 1. The amount of resin included by the mica layer 3 makes up 12.9 wt % of the total weight of the high-thermal-conductivity insulating tape 1, and the amount of resin included by the high-thermal-conductivity filler layer 7 makes up 15.0 wt % of the total weight of the high-thermal-conductivity insulating tape 1, and hence the amount of resin 8 included by the glass cloth layer makes up 3.5 wt % of the total weight of the high-thermal-conductivity insulating tape 1.

This high-thermal-conductivity insulating tape 1 was manufactured in the following manner. First, an aggregate mica foil 2 (weight: 165 g/m2) made by aggregating mica particles dispersed in water by the use of a paper making machine and a glass cloth 4 (weight: 35 g/m2) were prepared, and these were impregnated with resin 8 comprising 100 parts by weight of a novolac type epoxy resin and 3 parts by weight of BF3 monoethylamine (amount of impregnated resin: 85 g/m2) and were bonded to each other to produce an aggregate mica sheet (a laminate of the mica layer 3 and the reinforcing material layer 5).

Then, alumina particles 6 and the resin 8 comprising 100 parts by weight of a novolac type epoxy resin and 3 parts by weight of BF3 monoethylamine were mixed in such a way that a weight ratio of the alumina particles to the resin 8 was 2 to 1, and 10 wt % by weight of methylethylketone was added thereto. The mixture made in this way was applied to the side of the reinforcing material layer 5 of the aggregate mica sheet in a mount of layer of 256 g/m2 by the use of a roll coater. The methylethylketone was then volatilized and removed in a drying furnace to produce a high-thermal-conductivity insulating sheet. The high-thermal-conductivity insulating sheet was then slit in a width of 30 mm by the use of a slitter to produce the high-thermal-conductivity insulating tape 1.

Figure 2:
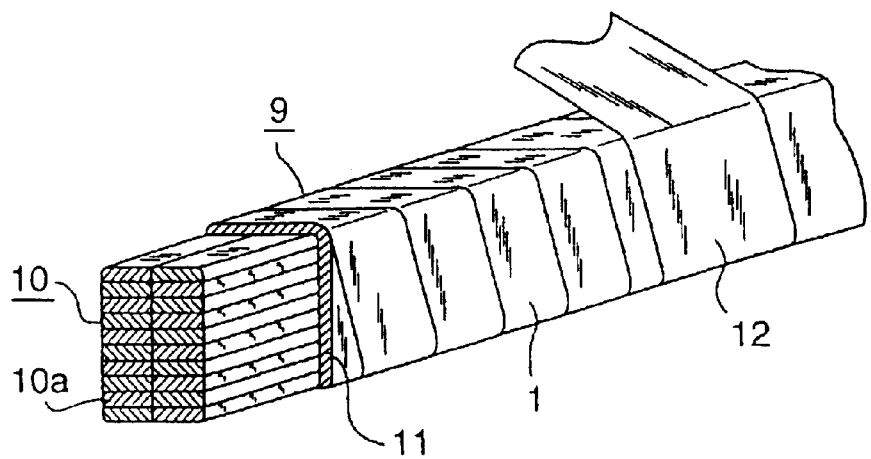
FIG. 2 is a perspective view of a structure of the electric machine winding of a preferred embodiment in accordance with the present invention.

Next, describing the structure of an electric machine winding 9 of the preferred embodiment in accordance with the present invention on the basis of FIG. 2, the electric machine winding 9 has a winding conductor 10 formed by winding a plurality of insulated conductors 10a and a high-thermal-conductivity insulating layer 11 formed on the outer peripheral portion of the winding conductor 10. This electric machine winding 9 was manufactured in the following way. First, as shown in FIG. 2, a plurality of insulated conductors 10a were wound a plurality of turns to form the winding conductor 10 and the high-thermal-conductivity insulating tape 1 shown in FIG. 1a was wound around the outer peripheral portion of the winding conductor 10 in such a way that it partially overlapped each other. Here, any of the mica layer 3 and the high-thermal-conductivity filler layer 7 may be arranged next to the winding conductor 10 side and, in the present preferred embodiment, the high-thermal-conductivity insulating tape 1 was wound around the outer peripheral portion of the winding conductor 10 with the mica layer 3 next to the winding conductor 10 side. In this respect, in the case of using the high-thermal-conductivity insulating tape shown in FIG. 1b, either the reinforcing material layer 5 or the high-thermal-conductivity filler layer 7 may be arranged adjacently to the winding conductor 10. A releasing tape 12 was wound around the outer peripheral portion of the high-thermal-conductivity insulating tape 1. It is because of preventing the adhesion of a forming jig to the high-thermal-conductivity insulating tape 1 that the releasing tape 12 is wound around the outer peripheral portion of the high-thermal-conductivity insulating tape 1.

Figure 3:
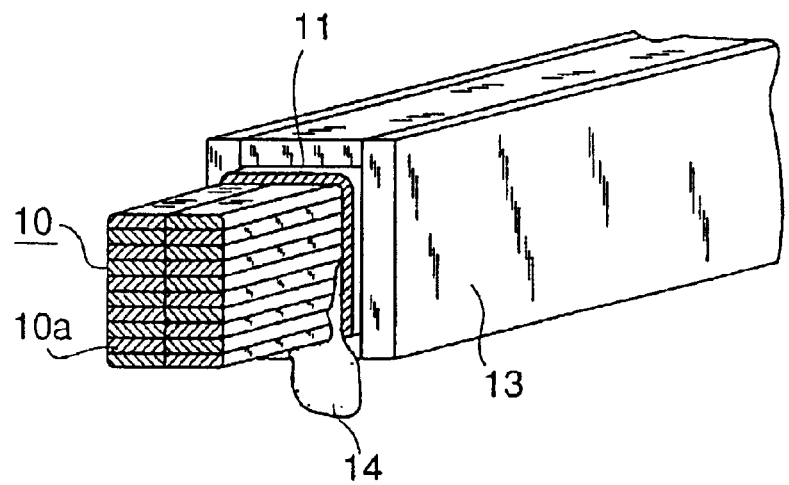
FIG. 3 is a perspective view for illustrating one manufacturing process of the electric machine winding of a preferred embodiment in accordance with the present invention.

Thereafter, as shown in FIG. 3, a forming jig 13 having a heating and pressing means (not shown) was mounted on the high-thermal-conductivity insulating tape 1 and an external force was then applied to the outer surface of the high-thermal-conductivity insulating tape 1 to thereby discharge fine bubbles included in the high-thermal-conductivity insulating tape 1 with a part of the resin included in the high-thermal-conductivity insulating tape 1, while the high-thermal-conductivity insulating tape 1 was simultaneously heated at a predetermined temperature to cure the resin 8 in the high-thermal-conductivity insulating tape 1, whereby the high-thermal-conductivity insulating layer 11 was formed. In this way, the electric machine winding 9 was produced. The electric machine winding 9 manufactured in this way was placed in the slot of the iron core of a rotary electric machine such as a generator, an electric machine, or the like.
(Comparative embodiment)

Next, the results of the alternating current dielectric breakdown voltage tests of the electric machine winding of the present preferred embodiment and the electric machine winding of a comparative embodiment will be described on the basis of a Table 1. A high-thermal-conductivity insulating electric machine winding formed of a high-thermal-conductivity insulating tape manufactured in the following way was used. The high-thermal-conductivity insulating tape was manufactured in the following way. First, an aggregate mica foil 2 (weight: 165 g/m2) made by aggregating mica particles dispersed in water by the use of a paper making machine and a glass cloth 4 (weight: 35 g/m2) were prepared, and these were impregnated with resin comprising 100 parts by weight of a novolac type epoxy resin and 3 parts by weight of BF3 monoethylamine (amount of impregnated resin: 40 g/m2) and were bonded to each other to produce an aggregate mica sheet (a laminate of a mica layer 3 and a reinforcing material layer 5).

Then, alumina particles and the resin comprising 100 parts by weight of a novolac type epoxy resin and 3 parts by weight of BF3 monoethylamine were mixed in such a way that a weight ratio of the alumina particles to the resin was 3.5 to 1, and 10 wt % by weight of methylethylketone was added thereto. The mixture made in this way was applied to the side of the reinforcing material layer of the aggregate mica sheet in a mount of layer of 230 g/m2 by the use of a roll coater. The methylethylketone was then volatilized and removed in a drying furnace to produce a high-thermal-conductivity insulating sheet. The high-thermal-conductivity insulating sheet was then slit in a width of 30 mm by the use of a slitter to produce the high-thermal-conductivity insulating tape 1. In the high-thermal-conductivity insulating tape, the resin makes up 19.3 percent of the total weight of the high-thermal-conductivity insulating tape. The amount of resin of the mica layer makes up 7.1 wt % of the total weight of the high-thermal-conductivity insulating tape, and the total amount of resin of the high-thermal-conductivity filler layer makes up 10.4 wt % of the total weight of the high-thermal-conductivity insulating tape, and hence the amount of resin of the glass cloth layer makes up 1.8 wt % of the total weight of the high-thermal-conductivity insulating tape.

Thereafter, the electric machine winding was manufactured by the use of the high-thermal-conductivity insulating tape manufactured in the above-mentioned way. (EP 0 762 445 A2). The Method of manufacturing the high-thermal-conductivity insulating tape is the same as the method described in the present preferred embodiment and the description thereof will be omitted. Before conducting an alternating dielectric breakdown voltage test, an aluminum foil was wound around the outer peripheral portion of each of the electric machine winding of the present preferred embodiment and the electric machine winding of the comparative embodiment to form an aluminum electrode, respectively. An alternating voltage was applied across the aluminum electrode and the winding conductor of the electric machine winding of each of the present preferred embodiment and the comparative embodiment and an alternating dielectric breakdown voltage was measured. The test results will be shown in Table 1.

TABLE 1

MEASUREMENT RESULTS OF DIELECTRIC BREAKDOWN VOLTAGE

|  | Preferred embodiment | Comparative embodiment |
| --- | --- | --- |
| Measurement value (kV/mm) | 26.5 | 19.0 |
| Measurement value (kV/mm) | 29.0 | 17.5 |
| Measurement value (kV/mm) | 27.5 | 21.5 |
| Average value (kV/mm) | 27.7 | 19.3 |

As is evident from Table 1, the alternating current dielectric breakdown voltage was higher in the electric machine winding of the present preferred embodiment than in the electric machine winding of the comparative embodiment. This is because the high-thermal-conductivity insulating layer of the electric machine winding of the present preferred embodiment was formed of the high-thermal-conductivity insulating tape in which each of the amount of resin of the mica layer and the amount of resin of the high-thermal-conductivity filler layer makes up 10 to 25 percent of the total weight of the materials, respectively, and hence because when the high-thermal-conductivity insulating layer was formed, fine bubbles included in the high-thermal-conductivity insulating tape could be discharged, in a pressing process, with a part of resin in the high-thermal-conductivity insulating tape. Therefore, since the electric machine winding of the present preferred embodiment has a dense high-thermal-conductivity insulating layer having excellent electric characteristics, it can provide high reliability to a rotary electric machine operated at high voltage.

(Preferred Embodiment 2)

Next, another preferred embodiment in which random-shaped fillers (A) and spherical fillers (B) were used in combination will be described.

In the present invention, mica powder was dispersed in water and was aggregated with a paper making machine to form an aggregate mica foil having a thickness of 0.08 mm. A glass cloth having a thickness of 0.03 mm as a reinforcing member was bonded to the aggregate mica foil with a resin composition comprising 100 parts by weight of a novolac type epoxy resin and 3 parts by weight of BF3 monoethylamine added thereto to make a sheet. The above-mentioned resin composition was mixed with the random-shaped fillers (A) and the spherical fillers (B) in a composition shown in Table 2 with methylethylketone. This composition was applied to the reinforcing material side of the above-mentioned mica sheet with a roll coater to produce an insulating sheet. This insulating sheet was cut in a width of 30 mm to produce a mica tape. The above-mentioned mica tape was wound seven turns around a bunch of conductors whose single wires were previously subjected to an insulating treatment and having a size of 40 mm×10 mm×1000 mm in length in such a way that it overlapped each other in a range of a half of the width thereof, and was heated at 110° C. for 15 minutes and then at 170° C. for 60 minutes at a pressure of 5 Mpa to form an insulating material layer, whereby an insulating winding was manufactured. For comparison, an electric machine winding was made only by using the random-shaped fillers without using the spherical fillers and the characteristics thereof were measured. The measurement results will be shown in Table 2.

TABLE 2

EXAMPLE OF COMPOSITION OF FILLER

|  | Composition of filler | Thermal conductivity (W/m · K) | Dielectric breakdown voltage (kV/mm) |
|---|---|---|---|
| No. 1 | A(AlF$_3$; 97 wt %)/B(SiO$_2$; 3 wt %) | 0.55 | 28 |
| No. 2 | A(SiO$_2$; 96 wt %)/B(SiO$_2$; 4 wt %) | 0.58 | 29 |
| No. 3 | A(SiO$_2$; 93 wt %)/B(Al$_2$O$_3$; 7 wt %) | 0.57 | 28 |
| No. 4 | A(Al$_2$O$_3$; 90 wt %)/B(Al$_2$O$_3$; 10 wt %) | 0.57 | 29 |
| Comparative example | A(Al$_2$O$_3$; 100 wt %) | 0.57 | 18 |

As shown in Table 2, a mixture of the random-shaped fillers and the spherical fillers can produce a high-insulating layer having a high dielectric breakdown voltage without the deterioration of the thermal conductivity of insulating material in accordance with the present invention, a difference between the amount of resin in the mica layer and the amount of resin of the filler layer was made not more than 10 wt % by weight, when the insulating layer of the electric machine winding was formed, in a pressing process, a part of resin including fine bubbles to be discharged outside could be prevented from entering a layer having a smaller amount of resin from a layer having a larger amount of resin and from remaining there, which can produce the insulating layer of the electric machine winding having excellent electric characteristics.

The electric machine winding in accordance with the present invention can produce a high-reliability electric machine winding whose electric characteristics does not deteriorate even if it is used for various kinds of rotary electric machines.

INDUSTRIAL APPLICABILITY

According to the insulating material in accordance with the present invention, fine bubbles included in the insulating material can sufficiently be discharged with a part of resin in the insulating material, which can produce an insulating layer of an electric winding having an excellent electric characteristics.

What is claimed is:

1. An insulating material comprising:
    an insulating layer comprising a flake-shaped inorganic insulating material and a thermosetting resin;
    a reinforcement layer comprising a reinforcing material and said thermosetting resin;
    a filler layer comprising a filler material and said thermosetting resin;
        wherein said filler layer is bonded to said reinforcement layer and said insulating layer; and said thermosetting ream is semi-cured for bonding said insulating layer, said reinforcement layer, and said filler layer;
        wherein the amount of resin in said insulating layer is 10 wt % to 25 wt % of the total weight of said insulating material;
        wherein the amount of resin in said filler layer is 10 wt % to 25 wt % of the total weight of said insulating material; and
        wherein the difference between said amount of resin in said insulating layer and said amount of resin in said filler layer is not more than 10 wt %.

2. The insulating material according to claim 1, wherein said reinforcing layer comprises a glass cloth or a polyamide film.

3. The insulating material according to claim 1, wherein said filler layer includes inorganic fillers and/or short fibers having a thermal conductivity of at least 5 W/m·K, and wherein 1 wt % to 80 wt % of said inorganic fillers comprise sperhical fillers.

4. An insulating material comprising:
    an insulating layer comprising a flake-shaped inorganic insulating material and a thermosetting resin;
    a reinforcement layer comprising a reinforcing material and said thermosetting resin;
    a filler layer comprising a filler material and said thermosetting resin;
    wherein said filler layer is bonded to said reinforcement layer; and said thermosetting resin is semi-cured for bonding said insulating layer, said reinforcement layer, and said filler layer;
    wherein the amount of resin of said insulating layer is 10 wt % to 25 wt % of the total weight of said insulating material;
    wherein the amount of resin in said filler layer is 10 wt % to 25 wt % of the total weight of said insulating material; and
    wherein the difference between said amount of resin in said insulating layer and said amount of resin in said filler layer is not more than 10 wt %.

5. The insulating material according to claim 4, wherein said reinforcing layer comprises a glass cloth or a polyamide film.

6. The insulating material according to claim 4, wherein said filler layer includes inorganic fillers and/or short fibers having a thermal conductivity of at least 5 W/m·K, and wherein 1 wt % to 80 wt % of said inorganic fillers comprise spherical fillers.

* * * * *